(12) United States Patent
Sienel et al.

(10) Patent No.: US 7,876,698 B2
(45) Date of Patent: Jan. 25, 2011

(54) DISTRIBUTED PRESENCE MANAGEMENT IN PEER-TO-PEER NETWORKS

(75) Inventors: Jurgen Sienel, Leonberg (DE); Marco Tomsu, Ditzingen (DE); Peter Domschitz, Stuttgart (DE)

(73) Assignee: Alcatel Lucent, Paris (FR)

( * ) Notice: Subject to any disclaimer, the term of this patent is extended or adjusted under 35 U.S.C. 154(b) by 217 days.

(21) Appl. No.: 11/779,291

(22) Filed: Jul. 18, 2007

(65) Prior Publication Data

US 2008/0019291 A1    Jan. 24, 2008

(30) Foreign Application Priority Data

Jul. 20, 2006   (EP) ................... 06300819

(51) Int. Cl.
*H04L 12/26* (2006.01)
(52) U.S. Cl. .................... 370/252; 370/241
(58) Field of Classification Search ........... 370/252, 370/400, 389, 241, 257, 258, 254; 726/22; 709/227, 229
See application file for complete search history.

(56) References Cited

U.S. PATENT DOCUMENTS

| | | | |
|---|---|---|---|
| 7,206,934 B2* | 4/2007 | Pabla et al. ............ | 713/168 |
| 7,327,683 B2* | 2/2008 | Ogier et al. ............ | 370/236 |
| 7,571,228 B2* | 8/2009 | Classen et al. ......... | 709/224 |
| 7,640,299 B2* | 12/2009 | Kaler et al. ............ | 709/203 |
| 2002/0054572 A1* | 5/2002 | Saleh et al. ............ | 370/254 |
| 2002/0147810 A1* | 10/2002 | Traversat et al. ....... | 709/224 |
| 2003/0018930 A1* | 1/2003 | Mora et al. ............ | 714/42 |
| 2004/0064568 A1* | 4/2004 | Arora et al. ........... | 709/228 |
| 2004/0148326 A1* | 7/2004 | Nadgir et al. .......... | 709/200 |
| 2004/0162871 A1* | 8/2004 | Pabla et al. ........... | 709/201 |
| 2005/0144288 A1* | 6/2005 | Liao .................... | 709/227 |
| 2005/0232184 A1* | 10/2005 | Borella ................. | 370/328 |
| 2007/0233832 A1* | 10/2007 | Narayanan et al. ...... | 709/223 |
| 2008/0037562 A1* | 2/2008 | Saleh et al. ........... | 370/400 |
| 2008/0069105 A1* | 3/2008 | Costa et al. ........... | 370/392 |
| 2009/0219804 A1* | 9/2009 | Cole et al. ............ | 370/218 |

FOREIGN PATENT DOCUMENTS

WO    02/060124 A2    8/2002

OTHER PUBLICATIONS

Topology aware routing in structured peer to peer overlay networks Miguel Castro, Peter Druschel, Charlie Hu, Anthony Wowstron Microsoft Research, Rice University, Purdue University 2002.*

* cited by examiner

*Primary Examiner*—Chi H Pham
*Assistant Examiner*—Robert Lopata
(74) *Attorney, Agent, or Firm*—Fay Sharpe LLP

(57) ABSTRACT

The invention concerns a computer software product comprising a plurality of peers (2', 4, 5) adapted to participate in a peer-to-peer network where the computer software product comprises detection means for detecting actual presence information of a peer and where the computer software product comprises retrieval means for retrieving actual information about the peer, where the detection means is located on neighbor partner peer (4) of the peer (5) for detecting continuously whether the peer provides still actual information and the computer software product comprises propagation means for outdating the information about this peer in case of detecting that the peer is not alive.

The invention further concerns a network device and a method therefore.

6 Claims, 4 Drawing Sheets

DISTRIBUTED PRESENCE MANAGEMENT IN PEER-TO-PEER NETWORKS

The invention is based on a priority application EP 06 300 819.7 which is hereby incorporated by reference.

TECHNICAL FIELD

The invention concerns a computer software product for detecting actual presence information. The invention also concerns a method therefore and a network device.

BACKGROUND OF THE INVENTION

Currently there is a trend in telecommunication systems based on self-organising overlay networks e.g. using peer to peer technologies to reduce investments in centralised infrastructure nodes. Such overlay networks are used for distributed data storage, e.g. for user and location information, registrar functions etc. They provide optimized routing based on a "neighbourhood relationship".

Such a telecommunication system could for instance comprise entities ranging from a mobile presence server, a multi media phone to nearly any kind of device e.g. in a next generation network like the new IP Multimedia Subsystem (IMS).

Therefore it is necessary to provide the usual basic functionalities for such type of overlay networks. A well known and widely used services in traditional telecommunication networks is presence awareness.

In traditional networks usually a central presence server is used where a subscriber's presence state is maintained. The server notifies all subscribers that are interested in the published presence information, if the respective subscribers have admissible privileges. A major problem in traditional presence processing is that the client of a subscriber can suddenly disappear, without telling the server that it is going offline.

Aliveness tests such as "ping" mechanisms are used to regularly confirm that the subscriber's client is still present, i.e. reachable and alive. If in a centralized approach this node has to serve a huge number of users, this is correlated with a challenging high concentration of load and communication.

Such a server is disclosed in the U.S. Pat. No. 6,463,471. There one can find a peer-to-peer presence system using a central server for downloading the presence information about subscribers. It is clearly stated, that nodes i.e. subscriber's clients have to be regularly "pinged" in order to detect an off-line state.

The patent discloses a method for distributing and maintaining network presence information. According to an embodiment of the present invention, a user logs onto the Internet and transmits to a presence (information) server presence information, a list of peers (individual network users) whose network presence are of interest to the user, and a request for a list of peers interested in the user's network presence. The presence server then responds to the user with both a list including the last known Internet Protocol (IP) address for each peer the user is interested in and a list of peers interested in the user's Internet presence. The user then attempts to directly contact the peers on the first list by confirming and authenticating the received IP addresses. According to a policy, the user directly contacts the peers on the second list to inform those peers the user is currently signed on-line. Finally, the user periodically "pings" (directly contacts) the confirmed and authenticated IP addresses from the first list received from the IPIS to determine when those peers sign off-line. The drawback of these approaches is, that it either causes a huge load on a centralized server, or relay on frequent messages between peers to detect the offline state within a certain time frame.

The remaining problem is to provide a presence system that enables effective presence management with fast detection of leaving users without centralised server and minimized network and terminal load.

SUMMARY OF THE INVENTION

This problem is solved by a computer software product comprising a plurality of peers adapted to participate in a peer-to-peer network where the computer software product comprises detection means for detecting actual presence information of a peer and where the computer software product comprises retrieval means for retrieving actual information about the peer, where the detection means is located on neighbour partner peer of the peer for detecting continuously whether the peer provides still actual information and the computer software product comprises propagation means for outdating the information about this peer in case of detecting that the peer is not alive.

The problem is solved also by a method for providing actual presence information about a peer of a plurality of peers that form a peer-to-peer network, where the method comprising the steps of detecting actual presence information of a peer, providing and retrieving the actual information about the peer, where the detecting is distributed to a neighbour partner peer of a peer with respect to the topology of the peer-to-peer network and a neighborhood partner peer detects continuously whether its peer disappears and propagates actual presence information when detecting a disappearing of its peer to other peers.

And the problem is solved inter alia by network node of a telecommunication network adapted to perform this method In other words the invention concerns a concept to spread alive detection over a network of peers. Detecting the disappearing of a peer is managed by a neighbour peer. This disappearing information is propagated through the network.

The invention solves the original problem of providing presence information, without permanently sending messages to a central server or all subscribed nodes. It reduces the load on the network and provides stable mechanisms for detecting "sudden deaths" of nodes.

The claimed software minimize the active connections. This is of particular importance for mobile clients, where besides the general traffic volume and local processing effort, especially the usage rate of the mobile transport link has to be minimized e.g. to save battery power.

BRIEF DESCRIPTION OF THE DRAWINGS

The inventions is described in detail, where.

DETAILED DESCRIPTION OF PREFERRED EMBODIMENTS

Figure 1:
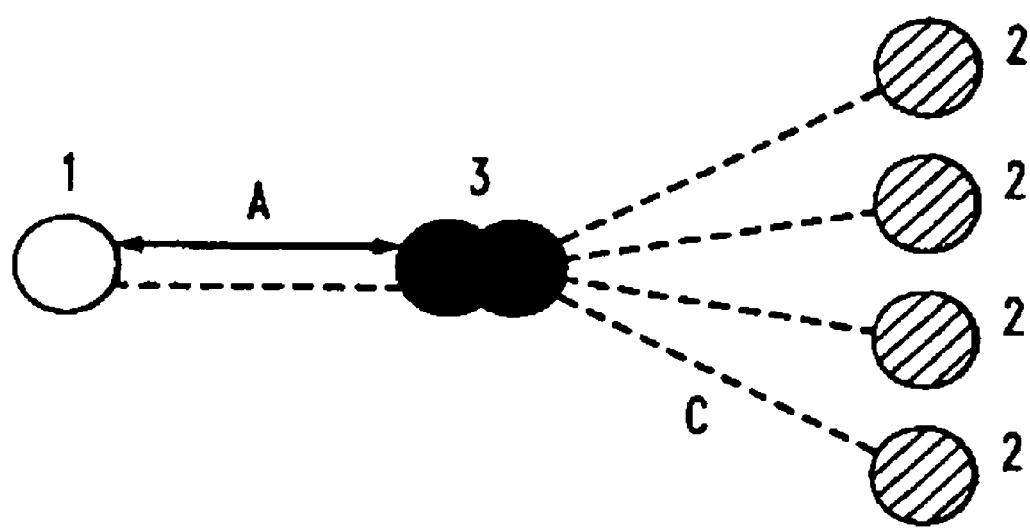
FIG. 1 shows a presence management according to prior art

FIG. 1 shows a client 1 that provides presence information to a central server 3. This information is provided by the central server 3 to further clients 2 that are interested. When the central server detects an presence change the information is communicated C to all further clients via the dotted lines. The central server 3 detects when the client 1 disappears, i.e. goes down or off-line, by regularly verifying the presence, i.e. the aliveness A.

Figure 2:
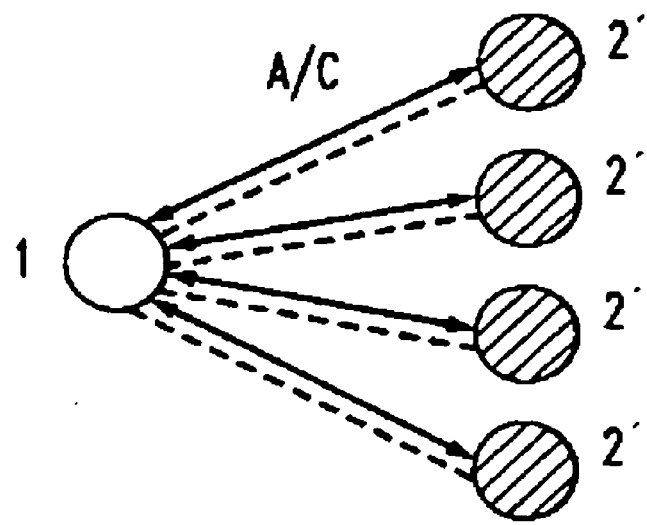
FIG. 2 shows a presence management in a peer to peer network according to prior art

Since there is a concentration of load and communication at the presence server this solution has the disadvantages mentioned in the introduction FIG. 2 avoids this concentration. There a client peer 1' informs directly further client peers 2' about its presence state. The further client peer' remains responsible for validating the actuality of this information, i.e. such a further peer will regularly verifying the presence. Thus the communication of the presence information C and the regular aliveness verification A will cause high network load.

Figure 3:
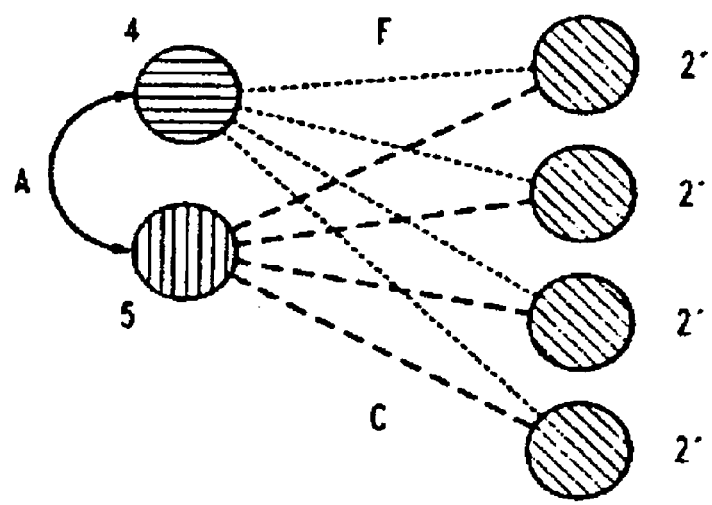
FIG. 3 shows a presence management in a peer to peer network according to the method according to the invention

FIG. 3 shows a peer to peer network that is configured to run the method according to the invention. The network comprises peers of three roles, the above mentioned further client peers 2' that are interested in actual presence information of the client peer 5, this client peer 5 and its neighbor peer 4. As shown in the previous figure presence information of the peer 5 is communicated C (shown by the dotted lines) to client peers 2'. But the client peers do not have to verify aliveness. This aliveness verification A is performed by the neighbor peer 4. When the client peer 5 leaves the network for some reason or the presence state simply changes, the neighbor peer 4 informs F the further client peers 2'.

The client peer 5 and the neighbor peer 4 build a reliable team. The further clients 2' can rely on the information 4 provided by the neighbor peer. For reliability reasons the aliveness probability could even be enhanced by securing the neighbor peer with a further neighbor and thus building redundancy. What even in this coarse picture is observable, that compared with the network configuration shown in FIG. 2 the aliveness is only verified once and communicated once. Thus the churn rate would be less since there is no repetition of the aliveness verifications.

Figure 4:
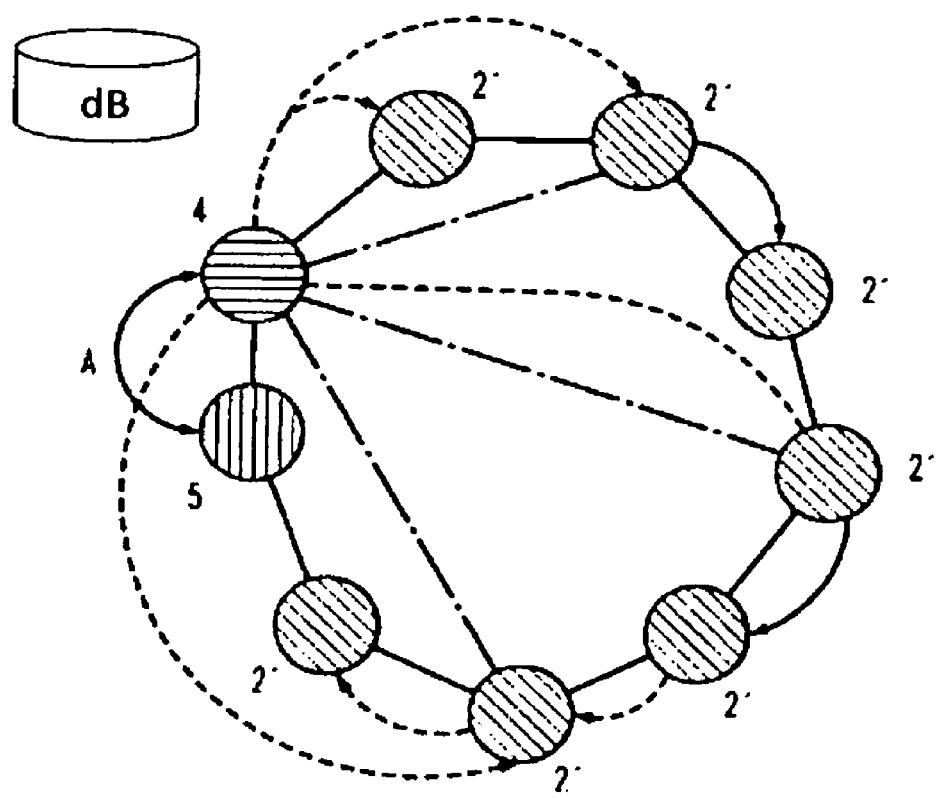
FIG. 4 shows a presence management in a Chord like peer to peer network according to the method according to the invention

FIG. 4 shows the instantiation of the principle shown in FIG. 3 applied to a Chord ring. The Chord ring consists of the peers mentioned above, namely the client peer 5, the neighbor peer 4, and the further client peers 2'. They are interconnected as a ring, shown by the solid arcs with short cuts, called fingers, shown y the long dotted-dashed lines. These lines define the topology of the peer to peer network. Usually such a connection topology has about order of less than quadratic (in the number of peers) connections.

When a presence change of the client peer 5 is observed by the neighbor peer 4 while verifying the aliveness A, the connection topology is used to propagate this information. Here a change is propagated via the ring and via the fingers. In such an overlay peer to peer network a node (clients are also called nodes and correspond often to network devices) regularly has established connections to a specific number of neighbors, like the two neighbors in a simple ring.

In Chord the nodes build a ring topology based on the key values generated by a hash function. All nodes have connections to their right and left partners and a set of "fingers" which enable shortcuts for message routing, see I. Stoica, et al. *"CHORD: A Scalable Peer-to-peer Lookup Protocol for Internet Applications"* in IEEE/ACM Transactions on Networking, Vol 11, No 1 (February 2003), pp. 17-32.).

The instantiation of the invention depends on the overlay network topology defining the neighborship relations. For peers behind borders providing network address translation function, as performed by standard SOHO (small offices and home offices) routers, for presence updates direct from the presence source to a subscribed peer a dedicated IP link has to be established first. This requires renewal of firewall hole punching after the firewall timeout period. The neighbor nodes will detect the leaving of a node automatically, in order to stabilize the topology of the overlay network.

This behavior of reliable disappearance information could be used in order to provide presence information to a list of nodes which should be informed about a kind of "sudden death" of a particular node. If a node activates this function it will provide a list of nodes that should be informed about a leaving to at least one of his neighbors.

Alternatively the neighbor will receive a reference to this list, if the list is stored in the distributed database, e.g. a distributed hashing table. As long as the node is registered in the network, the node can send his actual status and the changes of the presence state to the subscribed peer nodes or alternatively publish the presence state in the hashing table, which will notify the subscribed nodes. Since only changes are sent, the number of presence messages is low.

If a sudden death of the node occurs, the neighbor node will detect the death and inform the subscribed nodes, acting on behave of the node that left the overlay.

In case the supervising neighbor node dies, the peer-to-peer backup mechanisms are used and the node sends the related information to his new neighbor. Same procedure is performed in the case the neighborship relation to the node ends, due to the joining of a new neighboring node between the node and the original neighbor.

The described invention may be extended to hierarchical network configurations characterized by specific super peer nodes supporting a couple of regular peer nodes or even subordinate peer networks. In this case the super peers are then the neighbor nodes of choice for the affiliated standard peers. This does not exclude multiple homing concepts, where one peer is connected to multiple super peers at the same time.

Super peers usually show a reduced churn rate compared to standard peers, therefore super peers can be advantageously used not only to monitor the availability of the affiliated peers, but also to collect and distribute all presence information (presence out). This is of particular importance if the use of the communication link towards an end device has to be minimized, e.g. to save power in case of a mobile device. Again failure of super peers can be compensated by standard peer to peer protocol mechanisms. Presence relevant status information of a super peer has therefore be either copied regularly to a responsible neighbor super peer, stored in a shared database like the hashing table mentioned above or retrieved from the affected standard peers.

A super peer also may collectively subscribe (presence in) for the presence information of a multitude of remote peers on behalf of its affiliated standard peers. Such a collective presence subscription between super peers would reduce the needed network wide presence update information flows. Means are required, to endow the super peers with the individual presence information access rights.

Figure 5:
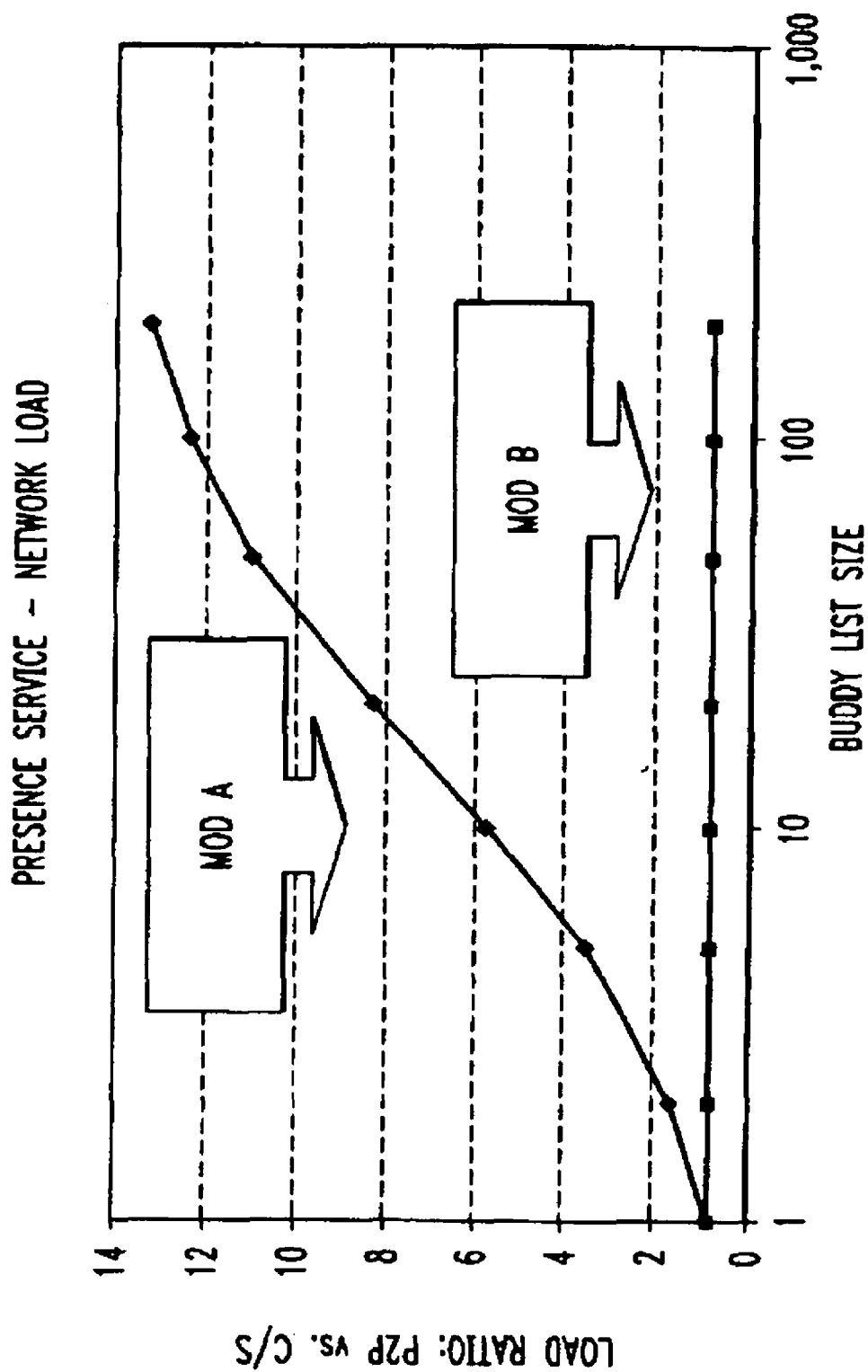
FIG. 5 shows the network load of the method according to the invention

FIG. 5 shows the network load of a typical peer to peer network with a buddy list size below 200 and a keep-alive rate of 30 verifications per hour. The graph labeled mod A shows the load of the method illustrated by FIG. 2. and the graph labeled mod B shows the load of the method illustrated by FIG. 3. The simulated presence change rate was 2 per hour. The ordinates is the to ratio of network load by the method illustrated by FIG. 1.

Figure 6:
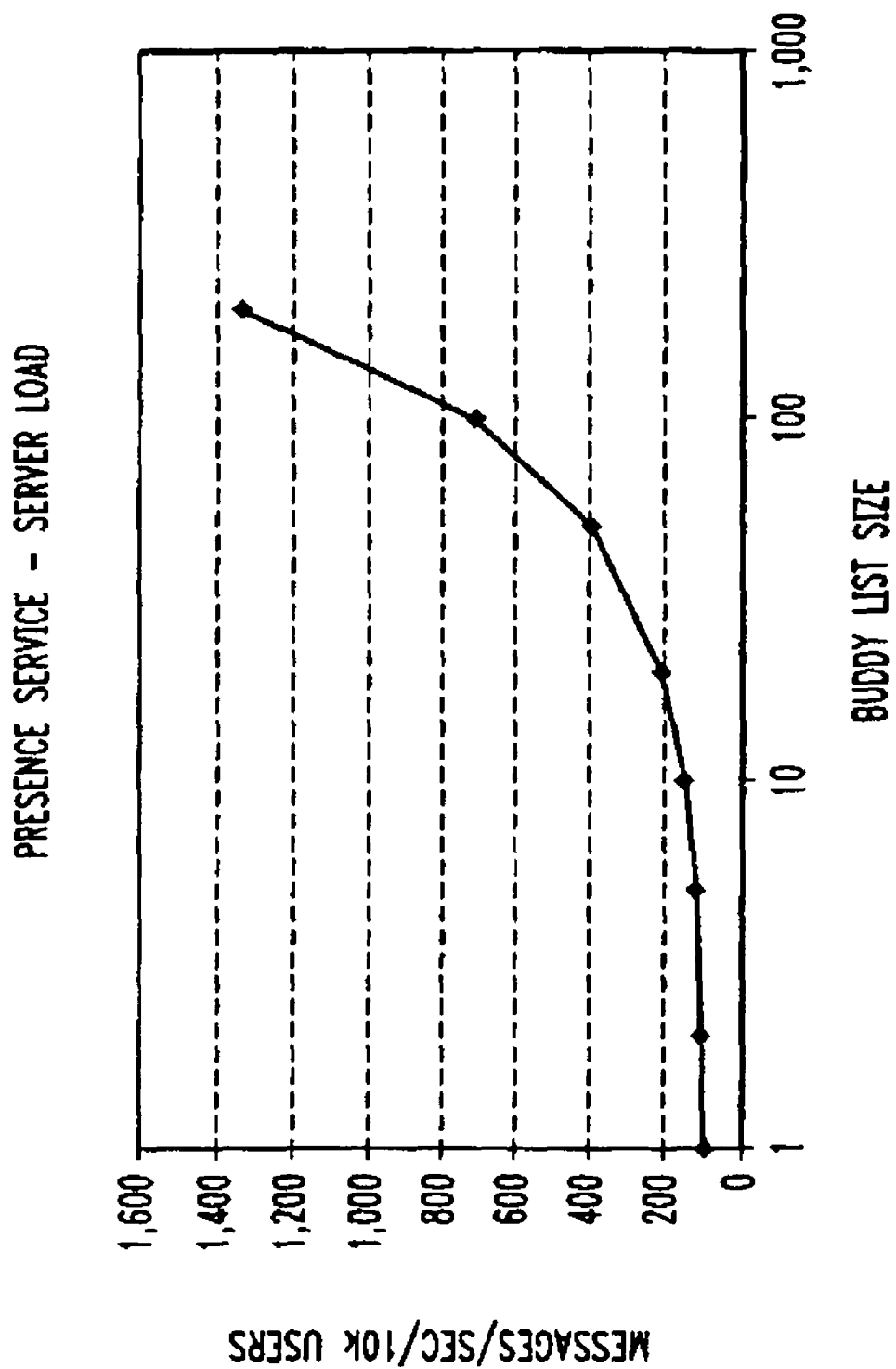
FIG. 6 shows the server load of the method according to the invention

FIG. 6 shows the tremendous server load of a central server 3 as depicted in FIG. 1 when the buddy list grows.

As a remark it should be noted that the topology induced by communications between peers could change while collaborating.

The invention claimed is:

1. A method for providing actual presence information about a peer of a plurality of peers that form a peer-to-peer network, the peer having a neighbor partner peer, the method comprising:

the neighbor partner peer detecting actual presence information of the peer;

providing and retrieving the actual presence information about the peer;

the neighbor partner peer continuously detecting whether the peer disappears and upon the disappearance of the peer the neighbor partner peer propagating the actual presence information of the disappearance to other peers forming the peer-to-peer network;

the peer providing a list of nodes in the peer-to-peer network which should be informed of the disappearance of the peer; and the neighbor partner peer propagating the presence information of the peer to the nodes in the list of nodes.

2. The method of claim 1 further comprising:

securing a further neighbor peer to the neighbor partner peer providing redundancy for detecting presence of the peer.

3. The method of claim 1 wherein the plurality of peers in the peer-to-peer network are connected in a Chord ring and further comprising:

the neighbor partner peer propagating the presence information to other peers using the Chord ring, wherein the neighbor partner peer is a predecessor or successor to the peer.

4. The method of claim 1 wherein the list of nodes is stored in a distributed database.

5. The method of claim 4 wherein the distributed database is a distributed hashing table.

6. The method of claim 1 wherein the peer-to-peer network has a hierarchical topology of layers and the neighbor partner peer is located in the same layer as the peer, and wherein the propagating includes propagating the actual presence information through the hierarchy.

* * * * *